(12) United States Patent
Davis et al.

(10) Patent No.: US 7,061,383 B2
(45) Date of Patent: Jun. 13, 2006

(54) RADIO FREQUENCY CHECK-IN

(75) Inventors: Garry L. Davis, Barrington, IL (US); William G. Couper, Barrington Hills, IL (US)

(73) Assignee: United Air Lines, Inc., Elk Grove Township, IL (US)

( * ) Notice: Subject to any disclaimer, the term of this patent is extended or adjusted under 35 U.S.C. 154(b) by 529 days.

(21) Appl. No.: 10/003,369

(22) Filed: Nov. 15, 2001

(65) Prior Publication Data

US 2003/0093305 A1 May 15, 2003

(51) Int. Cl.
*G08B 23/00* (2006.01)

(52) U.S. Cl. .................. 340/573.1; 340/572.1; 340/686.6; 340/5.81; 705/5

(58) Field of Classification Search ........... 340/573.1, 340/686.6, 572.1–572.9, 825.28, 5.7, 5.2, 340/825.49, 825.26, 5.8, 5.81, 5.86; 700/5
See application file for complete search history.

(56) References Cited

U.S. PATENT DOCUMENTS

| | | | |
|---|---|---|---|
| 4,984,156 A * | 1/1991 | Mekata | 705/5 |
| 5,225,990 A | 7/1993 | Bunce et al. | 364/478 |
| 5,401,944 A | 3/1995 | Bravman et al. | 235/375 |
| 5,581,630 A | 12/1996 | Bonneau | 382/116 |
| 5,866,888 A | 2/1999 | Bravman et al. | 235/375 |
| 5,886,634 A * | 3/1999 | Muhme | 340/572.1 |
| 5,914,671 A * | 6/1999 | Tuttle | 340/10.42 |
| 6,000,607 A * | 12/1999 | Ohki et al. | 235/379 |
| 6,044,353 A * | 3/2000 | Pugliese, III | 705/5 |
| 6,085,976 A | 7/2000 | Sehr | 235/384 |
| 6,111,506 A | 8/2000 | Yap et al. | 340/572.1 |
| 6,119,096 A | 9/2000 | Mann et al. | 705/5 |
| 6,127,917 A | 10/2000 | Tuttle | 340/10.1 |
| 6,198,909 B1 | 3/2001 | Du | 455/67.1 |
| 6,338,041 B1 * | 1/2002 | Kawamata | 705/5 |
| 6,580,356 B1 | 6/2003 | Alt et al. | 340/5.8 |

OTHER PUBLICATIONS

ChampionChip promotional literature, taken on Oct. 24, 2001, from www.championchip.com, 11 pages.
Texas Instruments promotional literature, taken on Oct. 24, 2001, from www.ti.com/tiris/docs/solutions/solutions.shtml, 11 pages.

* cited by examiner

*Primary Examiner*—Phung T Nguyen
(74) *Attorney, Agent, or Firm*—Brinks Hofer Gilson & Lione (57) ABSTRACT

An apparatus and method for an automatic check-in using radio-frequency (RF) identification cards are disclosed. Passengers who fly frequently are issued RF identification cards, which may be detected by detectors stationed in the lobby of an airport or at a boarding gate. When a card is detected, a computer checks the identification of the passenger against a passenger list for the flight that is presently boarding. If there is a match, the passenger is automatically checked in, a signal is given, and the passenger proceeds to board the flight. The method, and the RF check-in system, may also be used for other conveyances, such as cruise ships, railroad journeys, bus trips, or other modes of mass transit.

23 Claims, 7 Drawing Sheets

Fig. 6
Method of Using RF Check-in

Fig. 7 RF Check-In Procedure

Fig. 8 RF Boarding Procedure

RADIO FREQUENCY CHECK-IN

FIELD OF THE INVENTION

The field of the invention is automated processing and in particular automated processing for checking-in of passengers at a processing center and/or at a gate. The field in particular relates to automatic check-in so that a passenger avoids queuing during the identification and check-in phases of travel. The invention may include fields of transportation from trains and buses, to ships and airplanes.

BACKGROUND OF THE INVENTION

Waiting in lines is something virtually all travelers seek to avoid. Waiting in lines, however, has become common when checking-in for most modes of mass transit, whether on a cruise, a railroad excursion, or an airplane flight. Passengers wait in lines for check-in, that is, to identify themselves to security personnel, gate agents, flight attendants, customer service representatives or sales representatives of the carrier. After identification, the customer service representative may issue a boarding pass and allow the passenger to proceed to boarding if certain requirements are met. These requirements may include confirmation that payment has been made for the trip, that a reservation exists or a seat is available for the passenger, and that the passenger has identified himself or herself to the extent required by the carrier or by applicable rules and regulations of a government at the point of departure or the point of destination. These requirements are not exhaustive, and there may be other requirements, such as a minimum age for the passenger, a requirement that the passenger not be accompanied by pets, and the like.

The easiest way for a carrier, such as an airline, a cruise company, or other common or mass carrier to meet the requirements for embarking passengers is to arrange them into a line, and check them in, one by one. This method of processing is straightforward, because a small number of passenger representatives can check passengers in one-by-one, and check each required item sequentially: passenger name, reservation, payment received, seat availability, passenger ID, and so on. As each passenger checks in, the seating chart or manifest fills in, and check-in proceeds until all passengers are processed or the conveyance is filled, whether the conveyance is a ship, a train, a bus, an airplane, or other common carrier.

What is needed is an automated method for checking passengers into a conveyance for transit to a destination. An automated method would potentially require fewer passenger representatives, and could be faster if the passengers could board without interfacing individually with customer service representatives. The automated method should require a minimum of coordination between carrier personnel and port authority or airport authority personnel. The method should be computer based, both for speed of operation and retention of records for referral.

BRIEF SUMMARY

One embodiment of the invention is implemented in a method for conducting check-in a passenger having a radio frequency (RF) identification card. The method comprises a first step of a passenger making a reservation with a carrier. The carrier records information concerning the reservation, the information sufficient to at least identify the passenger and the conveyance desired. When the time for departure approaches, a computer processing means or microprocessor or computer terminal may retrieve information concerning the reservation for the carrier and the passenger. The information may include a manifest of passengers for the next departure. When the passenger arrives with the passenger's unique RF identification card, a long-range detector detects the card. A processing means compares the card with the reservation information, such as a passenger list, and if there is a match, the passenger is automatically checked in, that is, the passenger has been identified to the carrier as being present for boarding. The long-range detector may also be thought of as an interrogator, emitting RF signals and seeking responses.

Another embodiment is implemented in a system for radio frequency (RF) check-in, the system comprising several components. A radio-frequency enabled identification card is required for a passenger to participate. Each card is coded for unique identification of its owner or holder. A detector of the RF cards, such as a long range RF identification card reader is positioned where convenient, such as an airport gate. The detector is in communication with a processing means. A passenger list is stored in a memory of the processing means, or is accessible to the processing means. The processing means allows passage of the passenger holding the radio-frequency identification card when the detector detects the card and the processing means matches the passenger with a person on the passenger list.

When a passenger having a reservation and an RF identification card approaches the gate, the detector detects the RF identification card, and communicates information concerning the card to the processing means. The information may be an identification of the card, or a transliteration of the card information to a particular passenger. The processing means compares this information with a list of passengers, and if there is a match, signals to allow passage. A passage or passageway may also be part of the system.

It is not necessary for the passenger to present the RF identification card or to interface with operating or security personnel if the RF check-in is successful. The card reader detects the RF identification card in the possession of the passenger, much as a metal detector detects metal in the possession of a person passing through the metal detector.

Further aspects of the invention will be apparent from the drawings and description of the preferred embodiments detailed below.

BRIEF DESCRIPTION OF SEVERAL VIEWS OF THE DRAWINGS

FIG. 8 is a flow chart for an alternate method of using an RF check-in.

DETAILED DESCRIPTION OF THE PRESENTLY PREFERRED EMBODIMENTS

Figure 1:
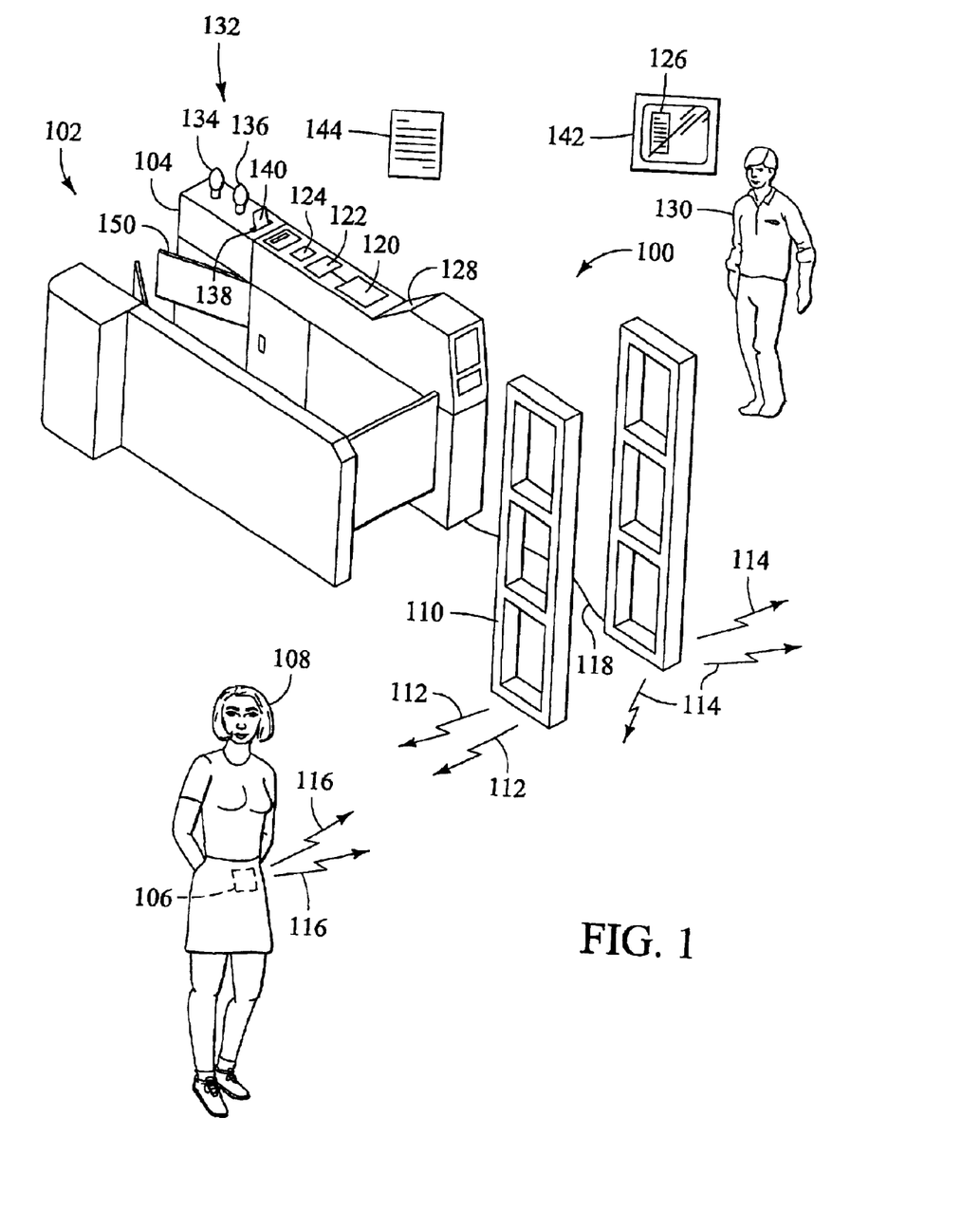
FIG. 1 is a perspective view of an embodiment of an RF check-in system at a gate.

FIG. 1 depicts an RF identification card check-in system 100 for use at a boarding gate 102, for instance, at a pier of a seaport or a gate 104 of an airport. The system preferably includes an RF identification card 106 of a passenger 108 approaching the gate 104. A long range reader or antenna 110 detects the card via radio-frequency pulses 112. The reader is connected to a radio-frequency transmitter/receiver that emits radiation 114 in a desired frequency range, for instance 13.56 MHz. The radiation reaches the RF identification card 106 of the passenger 108, and a signal 116 is sent back indicative of an identification of the possessor of the card. The reader then sends a signal via wire 118 to data processing and control elements of the RF identification system.

The signal is indicative of the possessor of the card. The signal may be any signal that uniquely identifies the particular RF card of the passenger. It is not necessary for the passenger to present the RF identification card. The card reader detects and identifies each card in the passenger's possession. While it may not be necessary for carrier passenger representatives to interface directly with passengers having RF identification cards, it is still necessary to enforce any required basic security procedures. Thus, the RF check-in system will preferably be located within a secured or otherwise confined area, with access controlled and availability limited to only a few passengers at a time within the range of the RF card reader. Thus, there should be no possibility that one person with an RF identification card can be detected and approved, while another person is actually admitted for passage.

The signal is received by a computer processing means 120 or by signal conditioning and processing circuitry 122 in communication with the computer processing means 120. The processing means may be a microprocessor or computer peripheral, so long as it is able to perform logic and memory functions. The microprocessor then processes the signal to determine the identity of the passenger, and also to compare the identified passenger with a list of passengers 126 for a departure. The passenger list 126 may be stored in a memory 124 of the processing means 120 or may be stored in a remote memory (not shown) accessible by the processing means 120. If the passenger is on the list for the departure or flight, the processing means sends a signal 128 to a checkpoint operator 130 that the passenger has successfully checked in. The signal may be any signal for which an output is conveniently provided. The check-in system 100 may include one or more indicator lights 132 that flash after a passenger has checked-in, wherein the computer or processing means may signal a green light 134 that the passenger check-in was successful, or a red light 136 if there is an irregularity in the process. The processing means or computer may be remote from the passenger area, so long as an output is available at the passenger or gate area to carrier passenger representatives.

Other signals are also possible. The gate 102 may be equipped with a printer 138, wherein the printer 138 prints a receipt 140 indicative of a successful check-in, such as a boarding pass or a seat-number or green ticket. If a check-in was unsuccessful for any reason, the printer may print instructions to a see a customer service representative, or may alternatively print a red ticket. Other outputs or signals may include instructions on a monitor 142 or message board 144 accessible by check-in or security personnel and possibly also to the passenger. The monitor 142 or message board 144 may instruct the passenger to proceed aboard, or to proceed elsewhere for further processing.

In addition to these components, the gate 102 may also include a passage that is controlled by the processing means. The passage may include a door 150 or other barrier such as a bar, a gate or a turnstile. In one embodiment of the invention, the barrier or passage is blocked until the computer signals that a passenger has the proper identification and is on the manifest or passenger list for the present departure. When the check-in has been successfully completed, the passenger may approach the barrier with confidence that the door will open, the gate will swing, or the turnstile will turn to admit the passenger.

Figure 2:
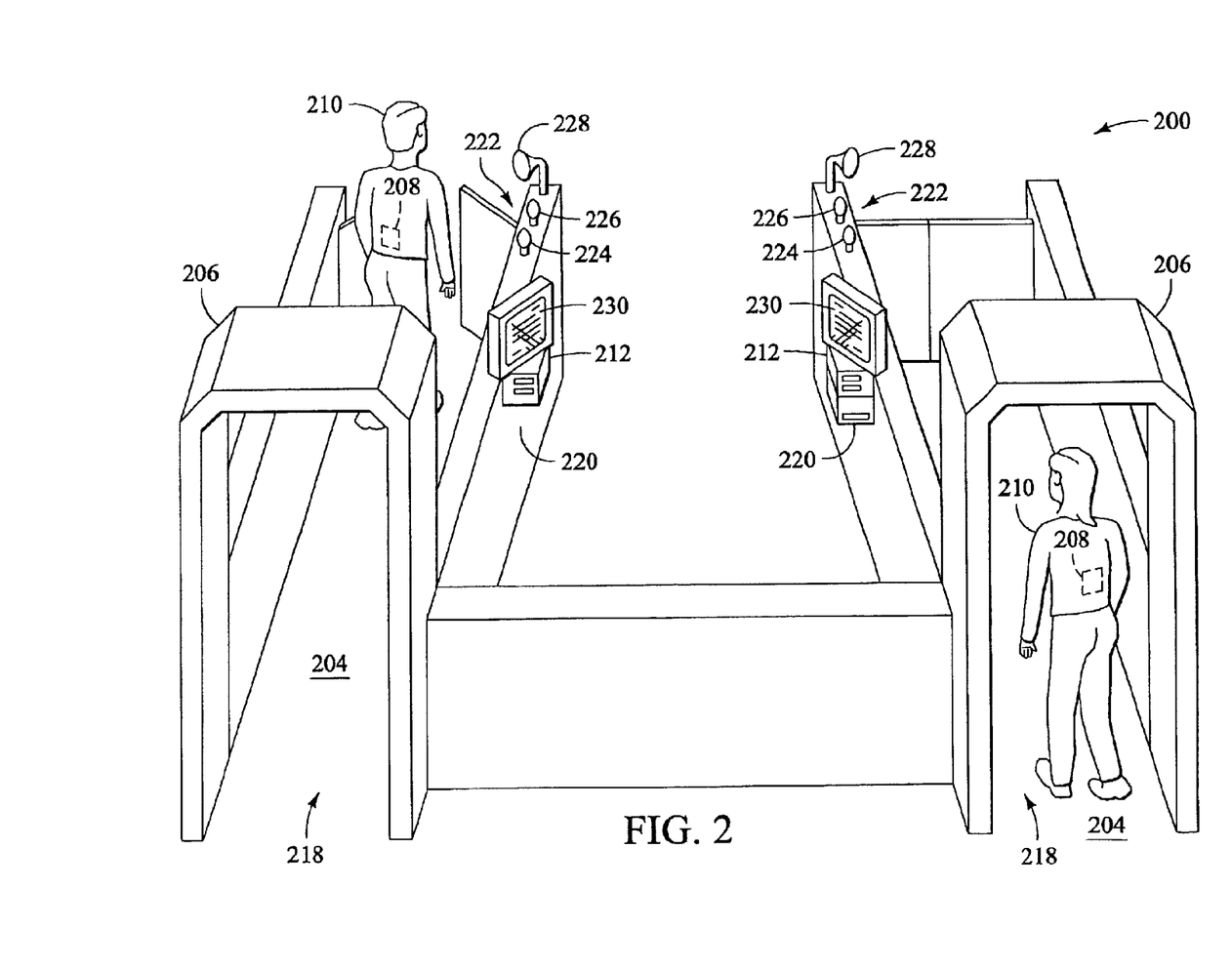
FIG. 2 is an embodiment of an RF check-in system at a lobby location or security checkpoint.

FIG. 2 is an embodiment of a check-in system 200 used not at an individual gate, but at a security checkpoint for more than one gate, such as a train station concourse or an airport concourse, or for the lobby of a bus or train terminal. The check-in system 200 may one or more automatic RF identification lanes 204 for automatic RF check-in. The automatic lane or lanes 204 preferably have at least one RF card reader 206 for reading an RF identification card 208 of a passenger 210. The automatic portion includes at least one computer processing means 212 for receiving signals from the card reader 206 identifying the passenger 210 via his or her RF identification card 208. The processing means 212 has access to a passenger list stored in a memory of the computer or accessible from a remote memory (not shown). The automatic lane 204 includes a passage 218 controlled by the computer processing means 212.

Processing means or microprocessor 212 controls passage 218 in the same way that sensors able to detect metal control passage through metal detectors. "Controlled" does not necessarily mean that a barrier blocks the passage until some signal is given; although such a barrier certainly controls passage of the passenger to the conveyance he or she seeks. "Controlled" may merely mean that the check-in system will signal to security personnel that a particular person is not successfully checked in, in the same way that a metal detector flashes or buzzes when metal is detected. A physical barrier is not needed at a manned checkpoint; a word or a signal to the operator is sufficient. Therefore, a computer or microprocessor controls a passage if it interfaces with a physical barrier, or if the it outputs a signal that check-in was or was not successful.

The signal may be given by a printer 220, printing a pass, or failing to print a pass, or printing instructions to contact security or customer service personnel. The signal may be given by one or more lights 222, such as a green light 224 to proceed or a red light 226 to seek assistance. The signal may be an audible signal from a speaker 228, such as a pre-recorded invitation to proceed, or alternatively an invitation to correct defects in the passenger's identification or reservation. The signal could also be given on a monitor or signboard 230, with instructions to proceed or to seek customer service help.

Figure 3:
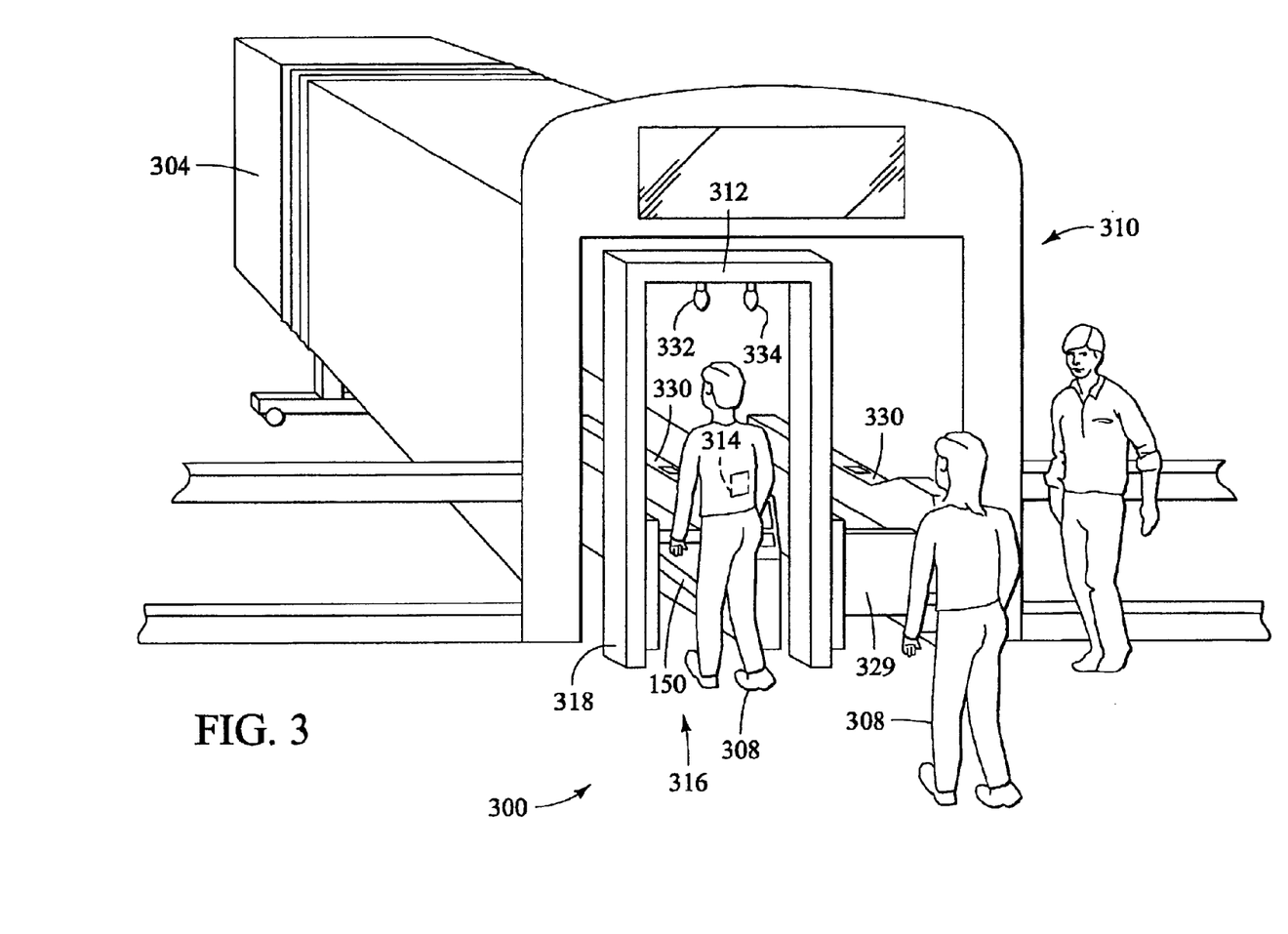
FIG. 3 is an embodiment of an RF check-in system at a boarding bridge location.

Turning now to FIG. 3, another embodiment of a radio frequency check-in system 300 is shown at a boarding gate, such as a boarding gate preceding a telescoping gateway 304 at an airport. The check-in system may include a conventional lane 310 for passengers 308 not equipped with RF identification. Passengers 308 with RF identification cards 314 may use an RF check-in lane 312 employing an RF check-in system 300. In one embodiment, the RF check-in system includes the RF identification cards 314 issued to passengers in advance, such as when passengers sign up for mileage bonus cards or "frequent flyer" programs. The system also includes at least one long range reader 316 and its antenna 318. The system also includes a microprocessor 330 connected to the long range reader 316. The microprocessor 330 also has a memory with a passenger list useful in matching passengers with their RF identification cards 314. The passenger list may alternatively be stored in a remote memory (not shown) accessible to the microprocessor 330.

The RF check-in system 300 also includes a passageway controlled by the computer means 330. The passageway in this embodiment is controlled by a barrier 150 that will allow passage if an RF-identified passenger check-in was successful. If the check-in was not successful, the check-in system 300 signals the passenger that the check-in was not successful by means of an instruction from a printer 138 to seek assistance from customer service personnel. Alternatively, a red light 332 may flash if identification was not successful or the data was not successfully received or matched. A green light 334 may flash to alert a passenger and airline personnel that check-in was successful. Other means to signal passengers may be used as outlined above, including audible messages, sign boards or other visible signals. The passage is under the control of the computer, in this embodiment both because the barrier 150 will not yield if the RF check-in was unsuccessful, and also because there is at least one method for signaling an operator whether a check-in was successful or unsuccessful.

Figure 4:
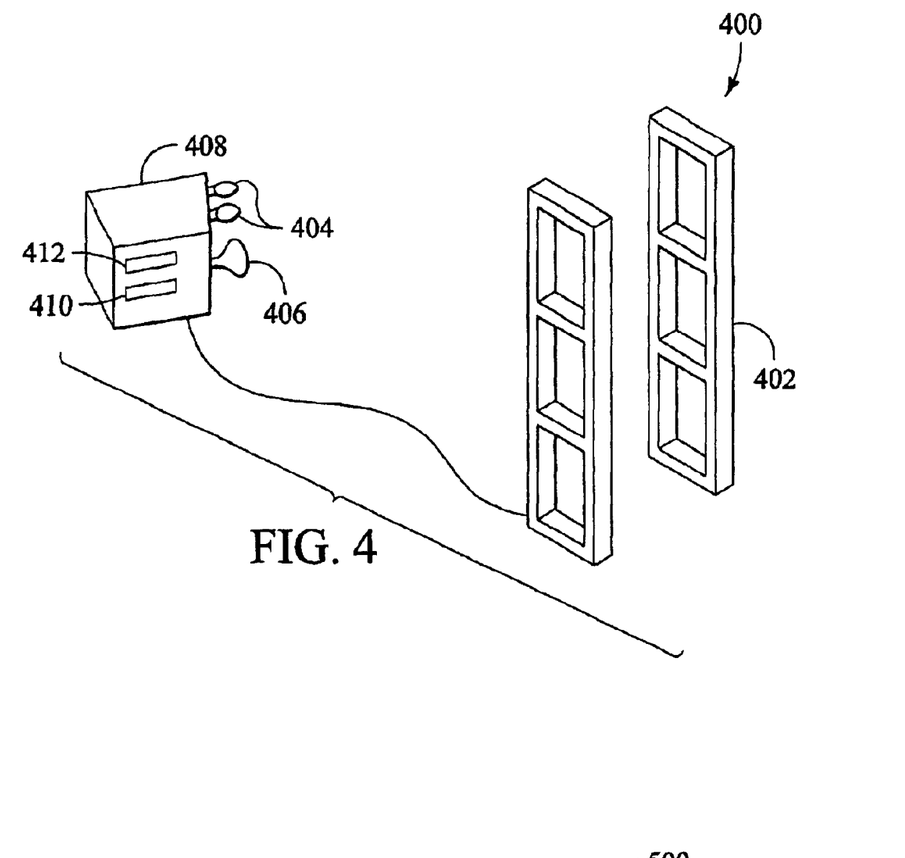
FIG. 4 is an RF identification card reader.

FIG. 4 depicts a long-range RF identification card reader 400, comprising two antennae 402. The antennae are desirably placed about 3 feet (1 m) apart. When so placed, the reader may detect standard 13.56 MHz RF identification cards passing between the antennae and coming as close as about 1.5 feet (0.5 m) within either antenna. The card reader may be purchased commercially, from firms such as Checkpoint Systems, Inc., Thorofare, N.J. Contained within housing 408 is an RF transmitter and receiver, for transmitting an RF signal to an RF identification card, and receiving back a signal from the card indicative of the owner of the card. The reader may be equipped with peripherals for signaling, such as electrical lamps 404, a piezobuzzer or piezoelectric sounder 406, or with one or more relays for other alarms or signals. In one embodiment, the reader 400 is equipped with an interface 410 for diagnostic purposes and an interface 412 to a computer means 330 of the RF check-in system 300.

Figure 5:
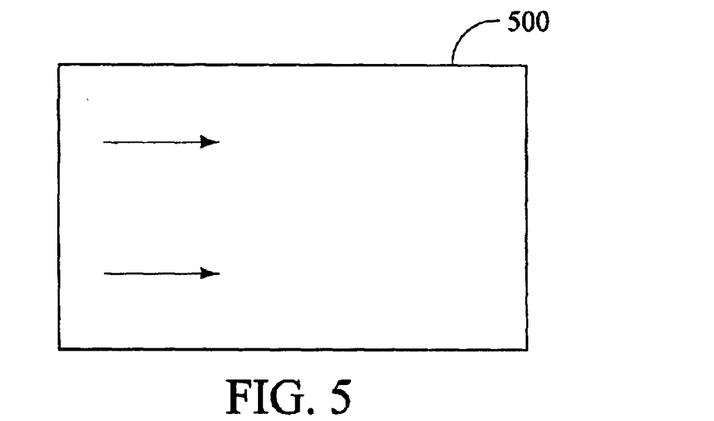
FIG. 5 is an embodiment of an RF identification card.

FIG. 5 depicts an RF identification card 500. The cards are commercially available from several sources, including Checkpoint Systems, Thorofare, N.J. Such cards typically are write-once, read many (WORM) cards, especially suitable for identification purposes. In one embodiment, such cards operating at 13.56 MHz incorporate an advanced integrated circuit from Microchip Technologies, Inc., Chandler, Ariz. Cards with a MCRF355 chip may have a capacity of up to 120 bits and may be "read" by a card reader in less than 1 second. The cards are will typically comply with ISO 7810 dimension standards (85.6 mm×54 mm×0.76 mm thick). Other frequencies may also be used, including 125 kHz, 134 kHz, 915 MHz and 2.45 GHz. As is well known in the art, the 13.56 MHz cards are a compromise between card cost (low), reading range (high), sensitivity to card orientation (low), and ability to penetrate body tissue (only limited ability to penetrate with 13.56 MHz).

One type of radio frequency card includes a resonant circuit embedded within the card, reactive to radio-frequency energy. When this circuit receives a radio-frequency input, it emits a radio frequency output, altered by the internal reactive or inductive circuit on the card. The output is unique to that card because of the unique identifiers embedded or programmed into the advanced integrated circuit and issued to a particular passenger or cardholder. Technologies from other manufacturers may also be used, such as radio frequency identification systems from Texas Instruments, Inc., Dallas, Tex., and ChampionChip, Inc., Nijmegen, The Netherlands.

Figure 6:
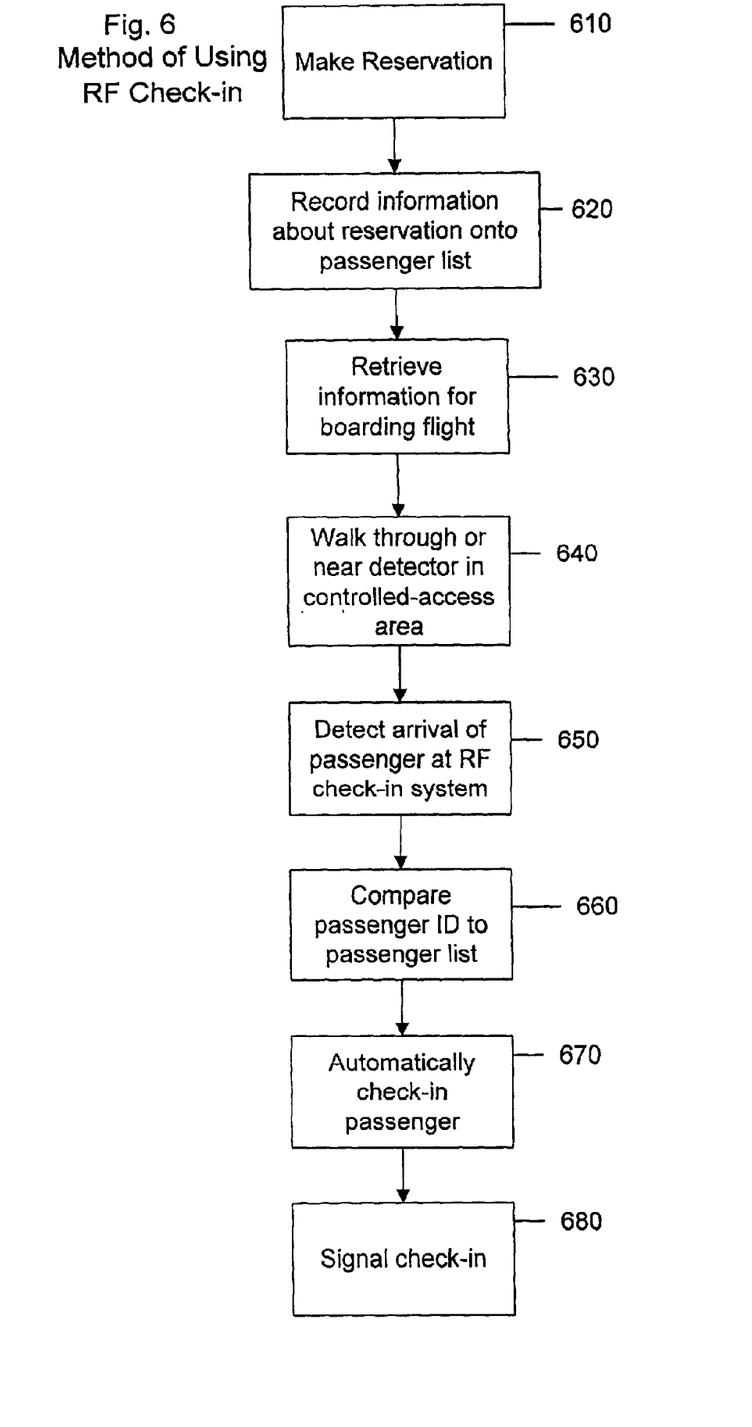
FIG. 6 is a flow chart for a method of automatically checking in a passenger.

FIG. 6 is a flowchart for an embodiment of a method for checking in a passenger having an RF identification card. A passenger desiring to travel makes a reservation 610. The airline or other common carrier records the information concerning the reservation, and compiles a list of passengers for a particular conveyance 620, such as an airline flight, a ship cruise, or a train or bus journey. At a time conveniently before the time of departure, the carrier may retrieve the reservation information or the passenger list 630 for use in admitting passengers to the conveyance. Alternatively, the passenger list may remain on a computer or computer memory accessible to employees or agents at the boarding gate or site. A passenger having an RF identification card approaches a check-in area utilizing RF check-in, and walks near or through an RF identification card detector 640. The detector, preferably in a controlled area or an area with controlled access, detects the RF identification card and identifies the possessor of the card 650. A computer means then compares the identification card with the passenger list or reservation information 660. If there is a match, the passenger is automatically checked in 670. The successful check-in is then signaled 680. The signal may be any one of a number of ways of informing security or operations personnel that the check-in was successful, and should also inform the passenger. The signal may take the form of a favorable audible chime, or a verbal announcement, such as, "Welcome to flight XXX, Mr./Ms. XXXXX." The signal may alternatively take the form of a printed boarding pass or coupon with information such as a seat number applied. The signal could also take the form of a flashing green light for a successful check-in, or a flashing red light if the lists do not match for some reason. Other signals may also be used, such as an actuator opening a barrier or a flap door. Any signal that unambiguously informs the passenger and carrier or security personnel of the situation is meant to be included within the scope of the present invention.

Figure 7:
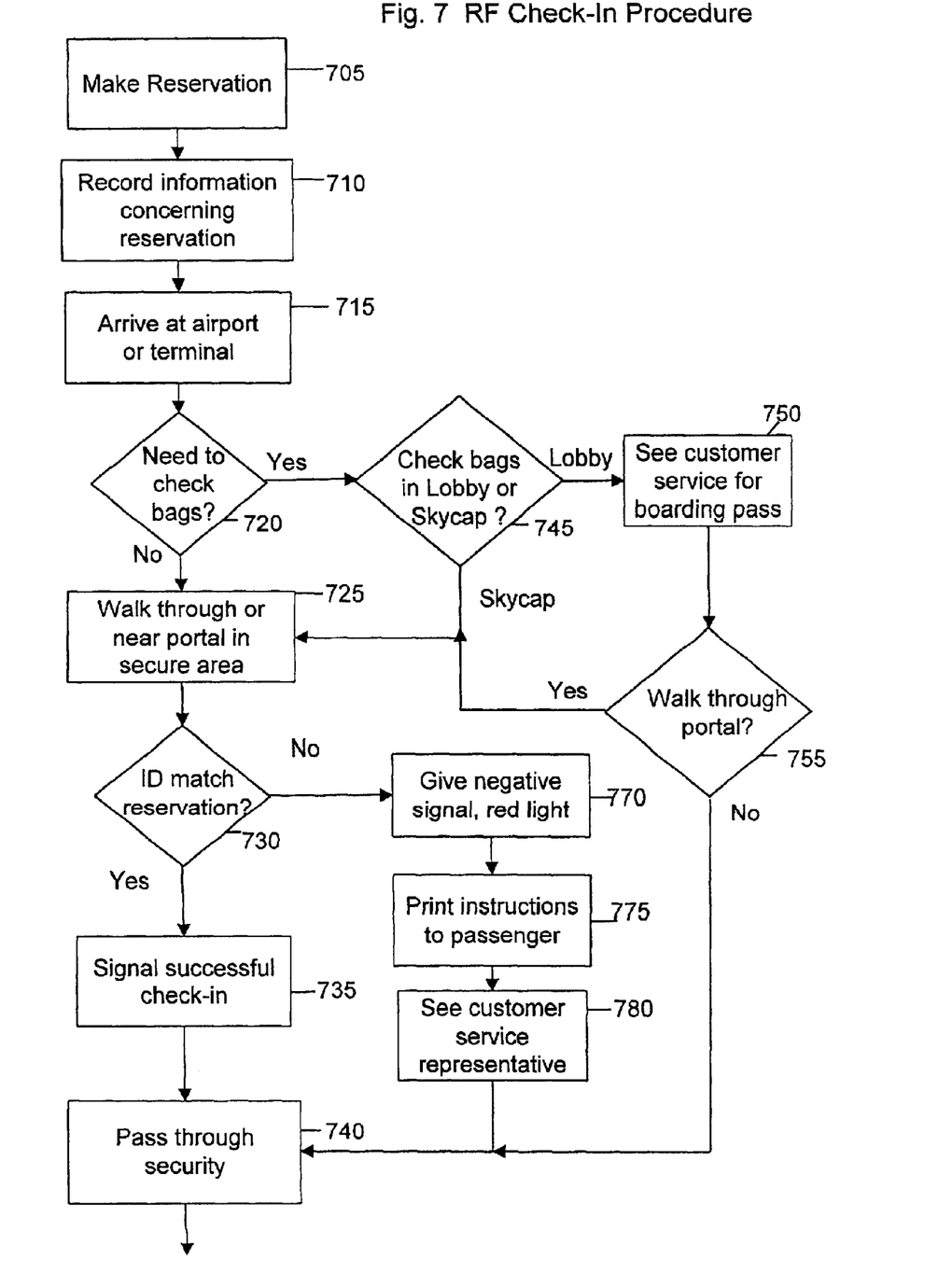
FIG. 7 is a flow chart for an alternate method of automatically checking in a passenger.

FIG. 7 is a flowchart for an alternate embodiment of the check-in process. In this embodiment, a passenger makes a reservation for a flight 705 and an airline records the information in its computers or memories 710 and may compile a passenger list for the particular flight. The information recorded may include the passenger's name and address, the preferred flight and time, the fare charged and the method of payment. Other information may include the specific seat reserved, the service class, any special needs or special meal ordered, and so on. The passenger arrives at the airport 715 and decides whether or not to check baggage 720. If no baggage need be checked, or if the passenger has checked bags at the curb 745 the passenger then proceeds to an RF check-in system and walks through the antennae of the detector or portal array 725, thus identifying himself or herself to the airline or to the check-in system. The portal is preferably in a secure or controlled-access area. A computer processing means then checks the passenger identification with other information about the passenger's reservation stored in a memory 730. If all criteria set by the airline have been met, the check-in is successful, and a signal is given to that effect 735. In one embodiment, a green light flashes, and a "successful" tone is emitted. The passenger then passes through any necessary security 740.

If the passenger has baggage that is not checked at the curb or by a Skycap 745, the passenger may be required to visit a customer service representative to check bags and receive a boarding pass 750. The passenger may then not need to walk through an RF identification system since the passenger has already identified himself or herself to airline personnel. However, in one embodiment, all passengers may need to proceed through the system, either an RF identification system in the lobby 755 or one at a gate or concourse 725. In one case, a passenger passes through a check-in system in the lobby and then proceeds directly to security 740 in preparing to board the flight. Such a mandatory RF check-in system may be an effective added layer of security for all passengers.

If the comparison 735 was unsuccessful, a different signal is emitted 770, such as a red light and a warning buzzer or other distinct signal to alert customer representatives or other personnel. If the incompatibility cannot be solved at that time, the passenger may need to see a customer service representative 780 to resolve the difficulty. The reason for a failure of the comparison may include variations of the passenger's name, or spelling errors. There may be other reasons also, such as a credit lapse, or other reason. If the difficulty is resolved, the passenger may then proceed to pass through security and prepare to board the flight.

Figure 8:
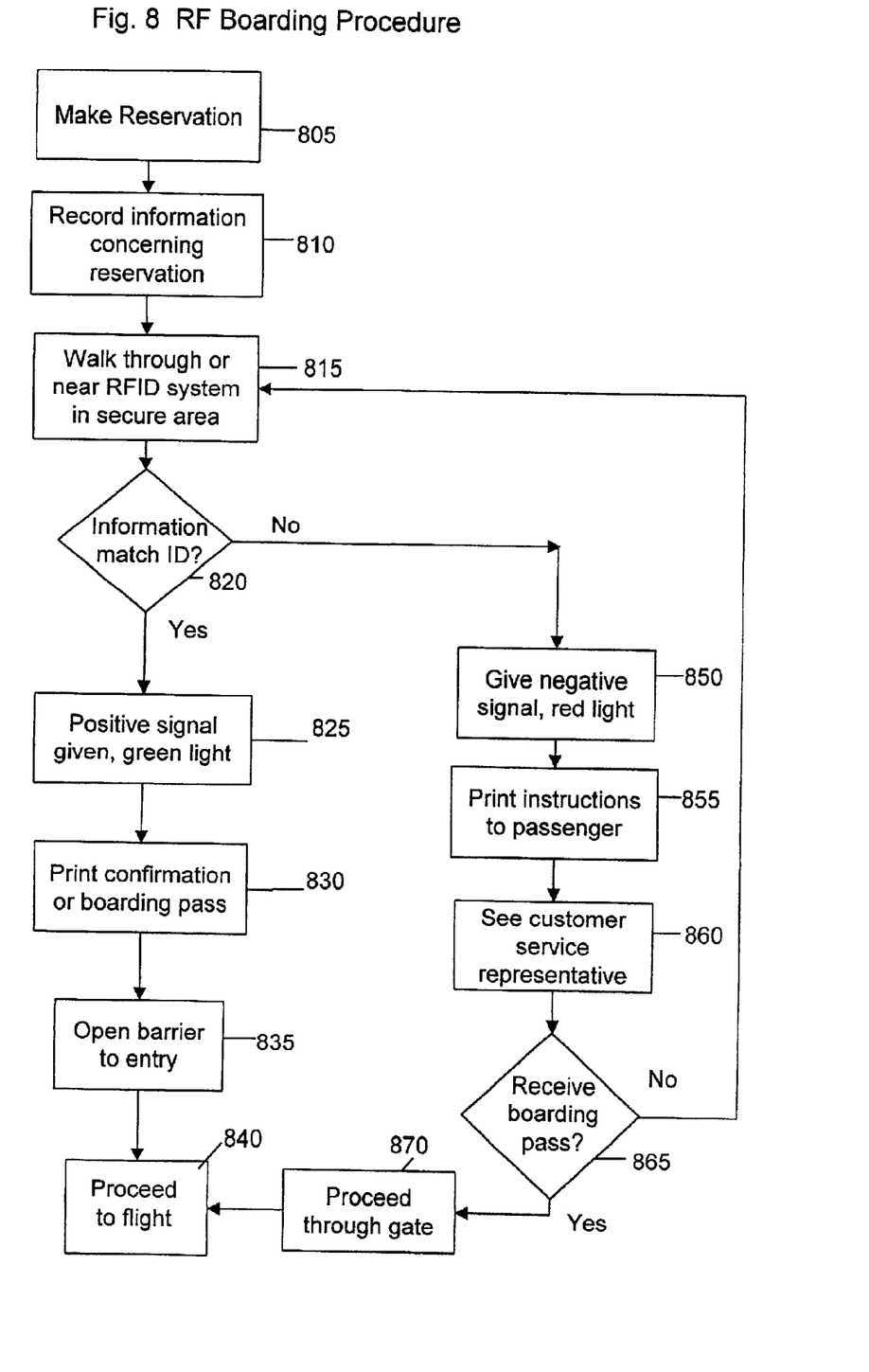

FIG. 8 is a flowchart for another embodiment of a method for checking in a passenger having an RF identification card. A passenger makes a reservation 805 for a particular flight, and the airline records information concerning the reservation 810. The information recorded may include the passenger's name and any identifier useful to the airline or agency taking the reservation, such as a "frequent flyer" number or a Mileage Plus® number that identifies the passenger as a preferred customer. The information may also include the flight selected, the time and destination, the particular seat reserved, the service class, the fare charged, and the method of payment. The information may also include other information pertinent to the customer, such as any special meal required, and so on.

In one embodiment, the passenger arrives at the airport and proceeds to an RF check-in system 815, the RF check-in system preferably located within a secure or control-access area. The RF detector detects an RF identification card on the passenger and a processing means nearby compares the identification with information from the reservation record 820. If the information matches and all are approved, the check-in is successful and the passenger receives a positive signal 825, such as a green light or a cheerful tone or beep. A printer at the RF check-in may then print a boarding pass or other document for the passenger that confirms the passenger's flight, destination, seat assignment, and class of service, among other information desired 830. In one embodiment, a gate or barrier to entry may then open 835, and the passenger proceeds to the board the plane 840.

If the comparison does not match, or if there is some irregularity in the reservation, the check-in may not be successful, and the passenger receives a negative signal 850, such as a red light or a warning buzzer. A printer may then print instructions to the passenger, such as "please see a customer service representative" 855. The passenger then proceeds to see a customer service representative 860. If the irregularity can be resolved, the passenger may then receive a boarding pass 865 and proceed through a gate 870 to the flight 840. If the difficulty cannot be resolved, or if there is some emergency, the passenger may then proceed back through the gate or concourse on the passenger's way back through the check-in system 815.

The common carrier checking in passengers may use the RF check-in system in a number of ways to assist passengers. The method includes a comparison of passenger identification via the RF identification card with information stored on the common carrier's database. Using this comparison, a carrier can put a "hold" on the passage of any passenger for a variety of reasons, including failure of credit or emergency notification for urgent messages.

There are many ways to use the invention, in addition to the ways described above. For instance, embodiments have depicted lights and buzzers to alert passengers and airline personnel of successful or unsuccessful matches. More discrete ways to notify passengers and airline personnel may be used, such as printed instructions or alerts via computer means that a match was or was not made. Alternatively, systems may be designed to require a positive indication that a match was made, such as a message being displayed, or a ticket being printed, or a sign flashing. No reaction at all from the computer processing means or its peripherals may signal that no match was made.

Accordingly, it is the intention of the applicants to protect all variations and modifications within the valid scope of the present invention. It is intended that the invention be defined by the following claims, including all equivalents. While the invention has been described with reference to particular embodiments, those of skill in the art will recognize modifications of structure, materials, procedure and the like that will fall within the scope of the invention and the following claims.

What is claimed is:

1. A method of conducting check-in for transportation for a passenger having a radio-frequency identification card, the method comprising:
   making a reservation for the passenger;
   recording information concerning the reservation;
   retrieving information concerning the reservation for passenger check-in;
   automatically detecting arrival of the passenger at a location via the RF identification card;
   comparing the passenger with reservation information;
   automatically checking in the passenger, wherein the radio-frequency identification card uniquely identifies the passenger and a detector detects arrival of the passenger; and
   printing a confirmation of the check-in.

2. The method of claim 1, wherein the location is selected from the group consisting of a check-in area and a gate.

3. The method of claim 1, wherein information printed is selected from the group consisting of passenger name, trip origin, destination, ticket number, one or more identification numbers, trip number, gate, seat assignment, and class of service.

4. The method of claim 1, further comprising walking through or near a radio-frequency detector.

5. The method of claim 1, further comprising signaling that the passenger has automatically checked in.

6. The method of claim 1, wherein the reservation is selected from the group consisting of an aircraft flight, a ship cruise, a railway journey, and a locomotive trip.

7. The method of claim 3, wherein the trip number is selected from the group consisting of a flight number, a train number, a cruise number, and a locomotive trip.

8. The method of claim 1, wherein a radio frequency detector detects an RF identification card by emitting an RF signal and detecting a return signal in accordance with an identity of the owner of the identification card.

9. The method of claim 1 further comprising matching the passenger with baggage of the passenger and detecting whether a passenger with baggage has checked in.

10. A method for checking in a passenger having an RF identification card, the method comprising:
    making a reservation for an airplane flight for the passenger;
    recording information concerning the reservation onto a passenger list;

retrieving information concerning the passenger list at an airline gate;

detecting the passenger having an RF identification card walking through or near a long range RF identification card detector;

comparing an identifier of the RF identification card with the passenger list;

automatically checking in the passenger;

signaling that the passenger has automatically checked in; and allowing the passenger to pass through a controlled passage.

11. The method of claim 10, wherein the step of signaling is selected from the group consisting of emitting a sound, opening a gate, flashing a light, printing a pass, and displaying a message.

12. The method of claim 10, further comprising checking baggage of the passenger, and linking information relating to said baggage with said information concerning the reservation.

13. A radio frequency check-in system, comprising:

a radio-frequency-enabled identification card for a passenger;

a detector for the radio-frequency identification card;

processing means in communication with the detector;

a passenger list, stored in a memory accessible to the processing means; and a first passage controlled by the processing means, wherein the processing means allows passage of the passenger holding the radio-frequency identification card when the detector detects the card and the processing means matches the passenger with a person on the passenger list.

14. The system of claim 13, wherein the detector detects the radio-frequency identification card and communicates an identifier of the passenger to the processing means, the processing means compares the identifier to the passenger list, and allows passage if the passenger is on the passenger list.

15. The system of claim 13, wherein the detector is a long-range reader of radio frequency identification cards.

16. The system of claim 13, wherein the detector detects an RF identification card by emitting an RF signal and detecting a return signal in accordance with an identity of the owner of the identification card.

17. The system of claim 13, wherein the first passage is selected from the group consisting of a manned checkpoint, a gate, a door, and a barrier.

18. The system of claim 13, further comprising a second passage controlled by the computer, wherein a passenger automatically checking in may proceed through the first passage or the second passage.

19. The system of claim 13, further comprising means for signaling whether the passenger has automatically checked in.

20. The system of claim 13, wherein the means for signaling is selected from the group consisting of a sound, a light, a message board, a printer, and a gate.

21. A radio frequency check-in system, comprising:

a radio frequency identification card for an airline passenger;

a long-range reader capable of detecting said identification card;

processing means linked to the reader;

a passenger list, stored in a memory accessible to the processing means;

a passage controlled by the computer means; and means for signaling that the passenger has checked in, wherein the reader detects the identification card and communicates an identifier of the passenger to the computer means, the processing means compares the identifier to the passenger list, and allows passage if the passenger is on the passenger list and the means for signaling signals that the passenger has checked in.

22. The system of claim 21, wherein the passage is selected from the group consisting of a manned checkpoint, a gate, a door, and a barrier.

23. The system of claim 21, wherein the means for signaling is selected from the group consisting of a sound, a light, a message board, a printer, and a gate.

* * * * *

UNITED STATES PATENT AND TRADEMARK OFFICE
CERTIFICATE OF CORRECTION

| | | |
|---|---|---|
| PATENT NO. | : 7,061,383 B2 | Page 1 of 1 |
| APPLICATION NO. | : 10/003369 | |
| DATED | : June 13, 2006 | |
| INVENTOR(S) | : Garry L. Davis et al. | |

It is certified that error appears in the above-identified patent and that said Letters Patent is hereby corrected as shown below:

<u>In the Claims</u>

Column 10, in claim 16, line 3, after "detecting a" delete "retum" and substitute --return-- in its place.

Signed and Sealed this

Ninth Day of January, 2007

JON W. DUDAS
*Director of the United States Patent and Trademark Office*